United States Patent
Tsiatsikas

(10) Patent No.: US 12,035,138 B2
(45) Date of Patent: Jul. 9, 2024

(54) METHOD AND NETWORK SYSTEM FOR DEFEATING MEDIA-COORDINATED ATTACKS ON EMERGENCY CALL NETWORKS

(71) Applicant: Unify Patente GmbH & Co. KG, Munich (DE)

(72) Inventor: Zisis Tsiatsikas, Salonika (GR)

(73) Assignee: Unify Patente GmbH & Co. KG, Munich (DE)

( * ) Notice: Subject to any disclaimer, the term of this patent is extended or adjusted under 35 U.S.C. 154(b) by 231 days.

(21) Appl. No.: 17/746,314

(22) Filed: May 17, 2022

(65) Prior Publication Data
US 2022/0386127 A1 Dec. 1, 2022

(30) Foreign Application Priority Data
May 25, 2021 (EP) .................................. 21175767

(51) Int. Cl.
| | | |
|---|---|---|
| *H04L 29/06* | (2006.01) | |
| *H04L 9/40* | (2022.01) | |
| *H04L 29/08* | (2006.01) | |
| *H04W 4/90* | (2018.01) | |
| *H04W 12/122* | (2021.01) | |

(52) U.S. Cl.
CPC ....... *H04W 12/122* (2021.01); *H04L 63/1425* (2013.01); *H04L 63/1458* (2013.01); *H04W 4/90* (2018.02)

(58) Field of Classification Search
CPC .. H04W 12/122; H04W 4/90; H04L 63/1425; H04L 63/1458

USPC .......................................................... 726/26
See application file for complete search history.

(56) References Cited

U.S. PATENT DOCUMENTS

| | | | | |
|---|---|---|---|---|
| 10,498,894 | B1 * | 12/2019 | Mongrain | H04M 3/5232 |
| 10,616,412 | B1 * | 4/2020 | Brosowsky | H04W 4/02 |
| 10,667,199 | B1 * | 5/2020 | Mitchell, Jr. | H04M 7/0093 |

(Continued)

FOREIGN PATENT DOCUMENTS

WO 2019168418 A1 9/2019

OTHER PUBLICATIONS

European Search Report for EP21175767.9 dated Oct. 27, 2021.
(Continued)

*Primary Examiner* — Haresh N Patel
(74) *Attorney, Agent, or Firm* — Buchanan Ingersoll & Rooney PC

(57) ABSTRACT

A method for defeating media-coordinated attacks on emergency call networks can include receiving, by a first ESRP element, a session initiation request with a session description Protocol (SDP) body wherein the session initiation request deviates from a preconfigured media threshold k from a caller. The sending of an alert notification to a second ESRP element and/or other ESRP elements is provided in response to a logging of the session initiation request which deviates from a preconfigured media threshold k in a set of requests. If there is a transcoding impact in the routing element that will handle the call, alert notifications which have been received using the subscribed/notify mechanism for a potential media-coordinated attacks form other ESRP elements in the network can be gathered and analyzed for processing to defeat a malicious attack on the network.

15 Claims, 3 Drawing Sheets

(56) References Cited

U.S. PATENT DOCUMENTS

| | | | | |
|---|---|---|---|---|
| 11,330,664 | B1* | 5/2022 | Martin | H04L 65/1033 |
| 2015/0085997 | A1* | 3/2015 | Biage | H04W 4/02 |
| | | | | 379/45 |
| 2016/0029197 | A1* | 1/2016 | Gellens | H04L 65/1104 |
| | | | | 455/404.1 |
| 2018/0301017 | A1* | 10/2018 | Dizengof | G08B 25/016 |
| 2018/0352094 | A1* | 12/2018 | Ginter | H04M 7/0087 |
| 2019/0253861 | A1* | 8/2019 | Horelik | H04W 64/006 |
| 2021/0219123 | A1* | 7/2021 | Kelly | H04L 45/306 |
| 2021/0250746 | A1* | 8/2021 | Mitchell, Jr. | H04W 4/90 |
| 2021/0352175 | A1* | 11/2021 | Nelson | H04W 4/029 |
| 2021/0368320 | A1* | 11/2021 | Mitchell, Jr. | H04W 4/022 |
| 2022/0086952 | A1* | 3/2022 | Cataniag | H04W 76/38 |

OTHER PUBLICATIONS

"Emergency Communications (EMTEL); Core Elements for Network Independent Access to Emergency Services" ETSI Technical Specification, European Telecommunications Standards Institute; ETSI TS 103 479 V1.1.1 (Dec. 2019), p. 1.

"9-1-1 DDoS: Attacks, Analysis and Mitigation" by Mordechai Guri, et al., 2017 IEEE European Symposium on Security and Privacy; DOI 10.1109/EuroSP.2017.23; IEEE Computer Society, p. 1.

* cited by examiner

METHOD AND NETWORK SYSTEM FOR DEFEATING MEDIA-COORDINATED ATTACKS ON EMERGENCY CALL NETWORKS

CROSS-REFERENCE TO RELATED APPLICATIONS

The present application claims priority to European Patent Application No. EP 21 175 767.9 filed on May 25, 2021. The entirety of this European Patent Application is incorporated by reference herein.

FIELD

The present invention relates to a method, a network system, and a computer program product for defeating media-coordinated attacks on emergency call networks.

BACKGROUND

Emergency calling services are a cornerstone of public safety. During the last few years, such systems are transitioning to VoIP and unified communications, and are continuously evolving under the umbrella of organizations, including National Emergency Number Association (NENA) and European Emergency Number Association (EENA). The outcome of this effort is Next Generation 911 (NG911) or Next Generation 112 (NG112) services operating over the so-called Emergency Services IP network (ESInet).

Emergency calling services allow every citizen to contact experienced professionals which reside on the Public Safety Answering Point (PSAP) side to communicate the details of an emergency incident and get help from first responders.

Every emergency caller can initiate an emergency session without any restriction regarding the media details of the call (i.e. the codecs that will be used in the SIP INVITE request). In fact, the latest Next Generation 911 (NG911) standard in the i3 version defines that the emergency calls could be served using audio, video and/or text.

SUMMARY

It was determined that one key element of Emergency Services IP network architecture pertains to the transcoding engines which are responsible for connecting endpoints that may not come to a media negotiation (i.e. successful RTP stream establishment). In such a case, the transcoding engine is responsible for translating different types of incompatible RTP streams on the fly.

The transcoding process has a special meaning in NG911 or NG112 ecosystems. According to the legislation, the vendors are obliged to serve every emergency call. So, in theory it is not possible to deny the emergency service in callers which do not support the same media details to the devices (i.e. desk phones) which reside on the PSAP side.

This potential can be exploited by attackers who can initiate fake emergency calls with specially crafted SDP bodies (i.e. HD videos) that require transcoding. These SDP bodies require a particularly large amount of CPU resources to perform the transcoding. It should be noted here that the more information and the better the quality in a stream, the more intensive the real-time RTP translation in terms of CPU cost.

For example, suppose the following scenario: an attacker illegally instructs an army of infected zombie computers to silently initiate a small number of emergency calls with transcoding-intensive SDP bodies.

A zombie virus gains access to a computer or smartphone system through the Internet and takes control of its resources. It uses the infected computer as its launch-pad—sending viruses, Trojan horses, or malicious data to other systems. While the virus and the harm it creates spreads, the original perpetrator's identity remains hidden. In the world of IT (information technology), the infected computer is known as a zombie computer. The perpetrator typically uses the infected computer to carry out illegal activities.

Using this type of attack an attacker can cause paralysis in specific elements of an emergency services network architecture only by using a portion of the session initiation messages that are usually be used on a pure volumetric Distributed Denial of Service (DDoS), for example in a media server that hosts the transcoding engine. The aim of the attack is to circumvent the network guards by sending a smaller number of SIP messages, compared to a traditional DDoS attack. This action will generate Real-time Transport Protocol (RTP) streams, which bring about resource draining operations in the emergency network. Such type of attack is very likely to be effective as there is no requirement for the media details transmitted via the SIP messages used in emergency calls.

The emergency calling centers are equipped with a set of digital signaling processing (DSP) modules which perform transcoding and are usually shipped in a media server element. The position of the transcoder may be in a different emergency network element, such as the PSAP. The most important problem with these types of modules is related to their costs and the number of streams which they can handle. In case of a media-coordinated DDoS attack launched from a botnet, the emergency network would need hundreds of these DSP modules to cover the transcoding needs. Or even worse, the machines that host these DSP modules would most probably be led to paralysis.

There is a broad prior art for the detection, prevention, and mitigation of SIP-based DDoS attacks. However, most of the works is concentrated on volumetric attacks. These attacks rely on the number of messages they send to a victim. However, there are no proposals from the state of the art on how media-coordinated attacks could be prevented and transcoding effort can be reduced in emergency networks.

Embodiments of the present invention can be based on the object to provide a method, a corresponding network system and a corresponding computer program product for defeating media-coordinated attacks on emergency call networks. For example, embodiments can be configured to reduce the possibility of transcoding operations in the emergency network to eliminate the overhead in the corresponding elements and additionally to mitigate a media-coordinated DDoS attack which aims on the paralysis of the transcoding engine.

For example, a method for defeating media-coordinated attacks on emergency call networks is provided that can include receiving, by a first Emergency Services Routing Proxy (ESRP) element, a session initiation request with a session description Protocol (SDP) body wherein the session initiation request deviates from a preconfigured media threshold k from a caller. The method can also include logging, by the first ESRP element, the session initiation request which deviates from a preconfigured media threshold k in a set of requests which meet the requirements of the first step. The method can also include sending, by the first ESRP element, an alert notification to a second ESRP element and/or other ESRP elements which have subscribed using a subscribed/notify mechanism for a potential media-coordinated attack. Subsequently, the method can include verifying, by the first ESRP element, if there is a transcoding impact in the routing to a first PSAP element of the first ESRP element that will handle the call, the call being transferred to the first PSAP element if no transcoding impact is present. Otherwise, if there is a transcoding impact in the routing to a first PSAP element of the first ESRP element that will handle the call, the method can include gathering and analyzing, by the first ESRP element, alert notifications which have been received using the subscribed/notify mechanism for a potential media-coordinated attacks form, the second ESRP element and/or other ESRP elements in the network. The first ESRP can also evaluate the alert notifications from the second ESRP element and/or other ESRP elements to deduce if there is any media-capable PSAP element in any one of the ESRP elements in the network which can handle the call without transcoding. If this is possible then the call is routed to a second PSAP element without transcoding. However, if this is not possible then downgrading, by the first ESRP element, the call to audio only and routing the call to the first PSAP element.

According to a preferred embodiment of the method, the preconfigured media threshold k is in a timeframe of x seconds and/or is based on the media capabilities of the devices present in PSAP elements which are monitored by the first ESRP element. The media threshold corresponds to the limit of the bandwidth, which is set from the emergency service, e.g., per ESRP element, which indicates the limit that can be handled by this ESRP, including the PSAP elements under this ESRP, with respect to the bandwidth and the transcoding capabilities of the hardware (i.e., media server, transcoder, devices).

According to another preferred embodiment of the method, the media-coordinated attack is a DoS or a DDoS attack.

According to still another preferred embodiment of the method, the alert notification comprises the transcoding impact if existing and/or the media capabilities of the devices present in PSAP elements which are monitored by the first ESRP element.

Further, according to a preferred embodiment of the method, wherein the method further comprising initiating a call in a private line between call takers of the first and second PSAP elements at the same time.

According to yet another preferred embodiment of the method, wherein in the case there is no media-capable PSAP element in any one of the ESRP elements in the network which can handle the call without transcoding, evaluating, by the first ESRP element, if there are more than one media descriptors in the SDP body of the session initiation request and stripping, by the first ESRP element, those media codecs which use the most CPU resources and then performing the transcoding process.

According to still another preferred embodiment of the method wherein prioritizing, by the first ESRP element, the call over other emergency calls before transcoding.

According to still another preferred embodiment of the method wherein during the transcoding process performing, by the first PSAP element, a content query in a social media source of the network to find similar media content with same media codec to this presented in the transcoding stream. If similar media content with same media codec to this presented in the transcoding stream, the caller is presented with the media content from the social media source.

According to still another preferred embodiment of the method wherein the media content query is done using Machine Learning techniques.

According to still another preferred embodiment of the method wherein dropping, by the PSAP, the call to only audio if similar media content with same media codec to this presented in the transcoding stream.

According to still another preferred embodiment of the method wherein dropping, by the PSAP, the call to only audio if the first PSAP has reached a certain media transcoding threshold n.

It should be appreciated that a PSAP can be a communication device that includes hardware. The PSAP can include a processor connected to a non-transitory computer readable medium and at least one transceiver. The computer readable medium can be a non-transitory memory, for example. The PSAP can include at least one input device and at least one output device, such as, for example, a display, a touch screen display, a pointer device, a mouse, a microphone, a speaker, a stylus, a keyboard, and/or a camera.

An ESRP can include a server or other type of computer device. The ESRP can include a computer device, such as a server that can host one or more services via at least one network. An ESRP can include a processor connected to a non-transitory computer readable medium and at least one transceiver. The computer readable medium can be a non-transitory memory, for example. The ESRP can include at least one input device and at least one output device, such as, for example, a display, a touch screen display, a pointer device, a mouse, a microphone, a speaker, a stylus, a keyboard, and/or a camera.

Communications involved in the method can include utilization of at least one network. The communications can include routes between one or more PSAPs and/or ESRPs or ESRP elements that include one or more network nodes or other intermediate devices. These elements can include access points, routers, base stations, border control elements, or other types of network nodes or intermediate nodes.

A network system comprising a plurality of ESRP elements is also provided wherein each of the ESRP elements comprise a plurality of corresponding PSAP elements with at least one device capable to receive calls, wherein the PSAP elements are monitored by their corresponding ESRP element and wherein the network system is configured to perform the method for defeating media-coordinated attacks on emergency networks. Such methods can include any of the above mentioned embodiments of a method for example.

According to a preferred embodiment of the network system the system further comprising at least one social media source and/or at least one media transcoder component.

According to another preferred embodiment of the network system the system further comprising at least one machine learning (ML) element, Interactive Voice Response (IVR) system, Gateway (GW), Border Control Function (BCF) and/or Session Border Control (SBC).

A computer program product that includes code stored in a non-transitory computer readable medium is provided wherein the code defines a method that is performed when a processor of a communication device runs the code. The method can include an embodiment of the above discussed methods, for example.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and exemplary embodiments thereof will be described below in further detail in connection with the drawings. It should be appreciated that like reference numbers can identify similar components.

DETAILED DESCRIPTION

Figure 1:
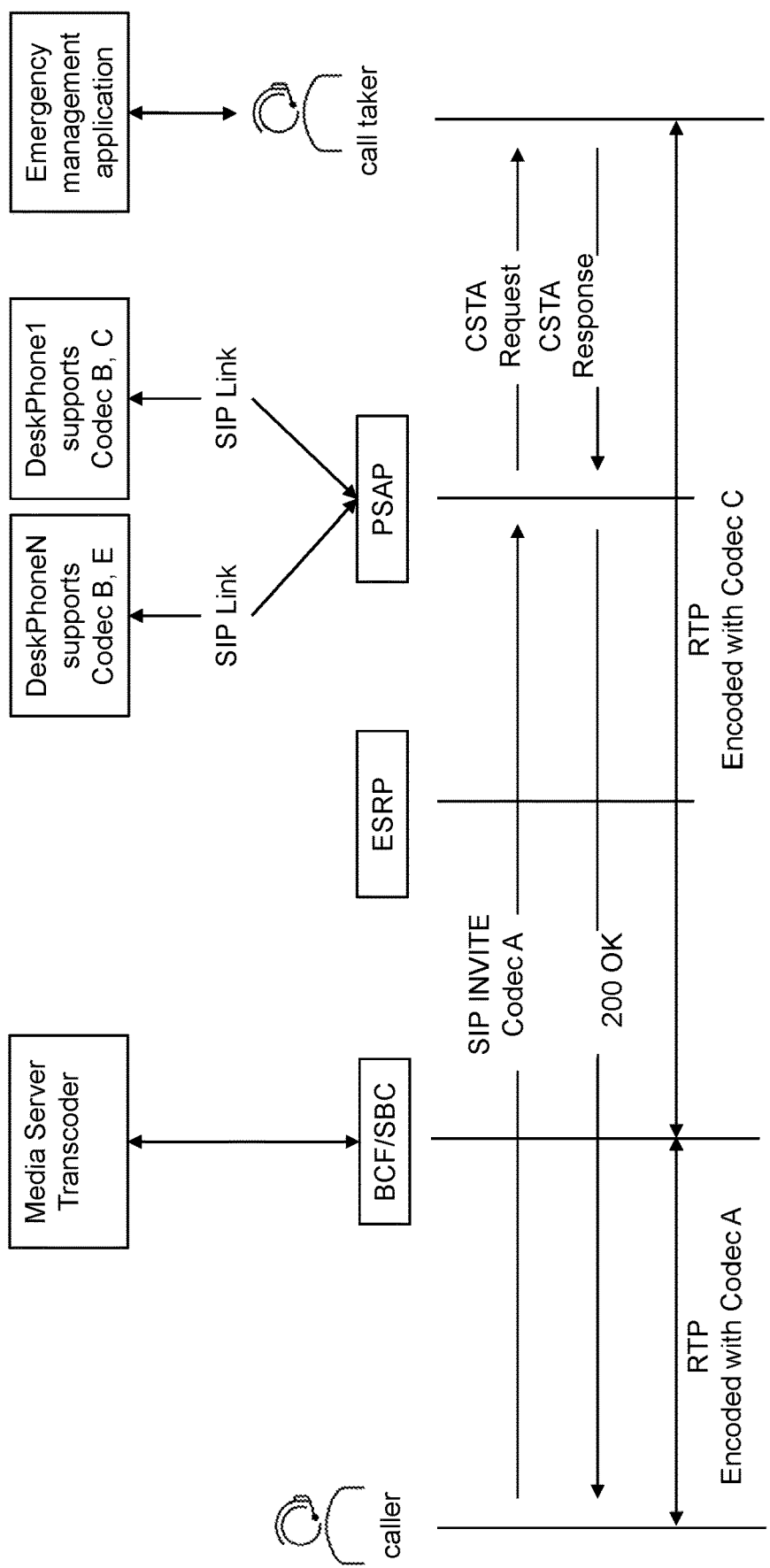
FIG. 1 shows a schematic illustration of how RTP streams may need to be transcoded on the fly in the context of an emergency communication path.

FIG. 1 shows a schematic illustration of how RTP streams may need to be transcoded on the fly in the context of an emergency communication path. Network elements for successfully routing an emergency call in an emergency network can include elements like the Emergency Services Routing Proxy (ESRP), and the Public Safety Answering Point (PSAP). The first can be responsible for selecting the appropriate answering point based on the caller's location while the latter is the last frontier of the network, namely the entity which can host the call takers. The PSAP always offers the possibility to connect a caller with an Interactive Voice Response (IVR) system in case a call taker is not readily available. The network topology is not the same in each network installation and thus the number of the ESRPs and the number of PSAP elements typically varies between different deployments. The problem here relates to the fact that the streams either audio or video which are established between the caller and the call taker can be solely based on the PSAP device capabilities. The emergency management application (i.e. GEMMA) which can be used by the call taker is only available for managing the calls by sending instructions to the hardware phone devices that reside on the PSAP side (DeskPhone1, DeskPhoneN). The communication between the emergency management application (i.e. GEMMA) and a private branche exchange (PBX) (e.g. Open Scape Voice (OSV)) can be realized using a different protocol like for example the Computer-Supported Telecommunications Applications (CSTA).

A typical PSAP deployment can include a set of hardware desk phones which are usually controlled via a web application e.g. an emergency management application. CSTA is a common protocol for this purpose. The web application may only cater for remote control to the desk phones, meaning that the audio and video streams solely rely on the capabilities of the latter. The devices which reside on the PSAP cannot handle all the types of codecs that will be offered by the callers. They can only handle these codecs which are shipped with their firmware. Therefore, the emergency architecture needs transcoders. It is usual that different PSAP elements may have devices from different vendors and thus support different codecs. In this example of FIG. 1, a caller sends a SIP INVITE request comprising in the SDP body a preferred Codec A to a PSAP in an emergency network. The SIP INVITE request that may previously pass-through other components of the network such as an ESRP and a Border Control Function (BCF), most often combined with a Session Border Controller (SBC) component associated with a media server transcoder. However, the desk phones within the PSAP only support codecs B, C or E as indicated in the example of FIG. 1. The PSAP responds with 200 OK to the SIP request, but then the RTP stream of the caller must be transcoded from Codec A to Codec C using the transcoder connected for example to the BCF/SBC for this embodiment. This transcoding of course costs CPU resources.

Figure 2:
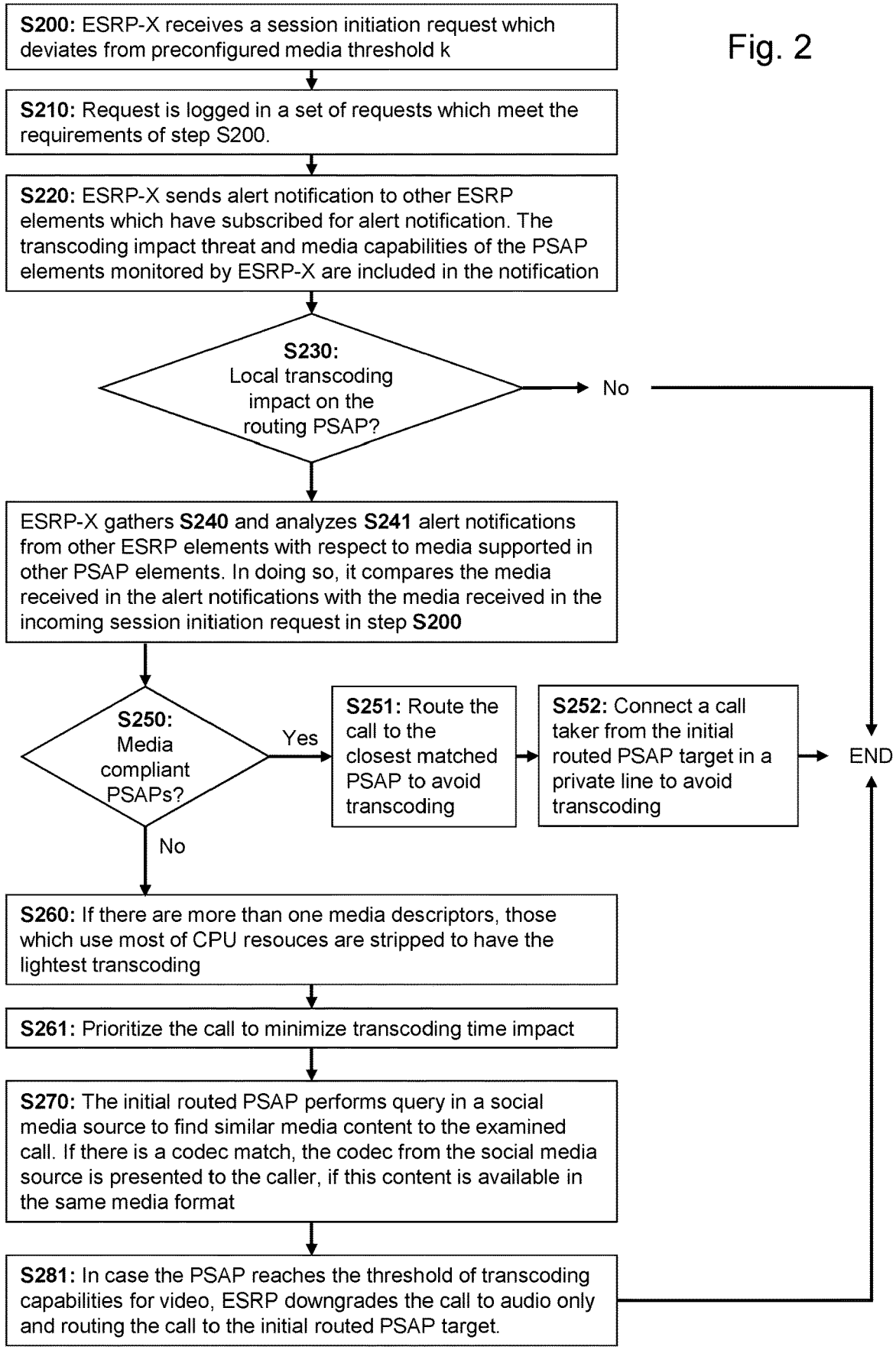
FIG. 2 shows a flowchart of a method for defeating media-coordinated attacks on emergency call networks according to an exemplary embodiment of the invention.

FIG. 2 shows a flowchart of an exemplary method for defeating media-coordinated attacks on emergency call networks according to an embodiment of the invention. In a first step S200, a first ESRP element hereinafter called ESRP-X receives a session initiation request with a session description Protocol (SDP) body. Wherein the session initiation request deviates from a preconfigured media threshold k from a caller. The preconfigured media threshold k is in a timeframe of x seconds and/or is based on the media capabilities of the devices present in PSAP elements which are monitored by ESRP-X. This "anomalous" session initiation request is logged or included in S210 by the ESRP-X in a set of requests which meet the requirements of step S200. The anomalous messages can be stored either in a DB in the ESRP, or in a remote cloud storage which can be accessed from other network elements in the ESInet for forensic reasons. Subsequently, in S220 ESRP-X sends an alert notification to another second ESRP element hereinafter called ESRP-N element and/or other ESRP elements in the network which have also subscribed for a potential media-coordinated DDoS attack, using a SUBSCRIBE/NOTIFY mechanism. The alert notification may further comprise the transcoding impact, if such an impact exists and/or the media capabilities of the devices present in PSAP elements which are monitored by ESRP-X. In the next step S230 it is verified if there is a transcoding impact in the routing to a first PSAP element hereinafter also called initial routed PSAP target of ESRP-X that will handle the call. In the case, if no transcoding impact is present the call is transferred to this first PSAP element and the method is terminated. Otherwise, if a transcoding impact is present the method proceeds further with steps S240/S241 wherein ESRP-X gathers and analyzes alert notifications which have been received using the SUBSCRIBE/NOTIFY mechanism for potential media-coordinated attacks from ESRP-N and/or other ESRP elements in the network. The other ESRP elements also meet the requirements of step S200 regarding the threshold value k and/or timeframe x in seconds. Further the transcoding impact threat and/or media capabilities of the PSAP elements monitored by other ESRP elements can also be included in the notifications if such information is available. ESRP-X compares the media received in the alert notifications with the media received in the incoming session initiation request in S200. In step S250 the ESRP-X evaluates the alert notifications from ESRP-N elements and/or other ESRP elements to deduce if there is any media-capable PSAP element in any one of the ESRP elements in the network which can handle the call without transcoding. If any PSAP is media-capable, in S251 the call is routed without transcoding to this second PSAP element hereinafter also called the closest matched PSAP element and in S252 the call taker from the initial routed PSAP target is connected in a private line with the new call taker in the closest matched PSAP. Otherwise, in S260, in the case there is no media-capable PSAP element in any one of the ESRP elements in the network which can handle the call without transcoding, ESRP-X element evaluates if there are more than one media descriptors in the SDP body of the session initiation request. If this is the case, those media codecs which use most CPU resources are stripped to have the lightest transcoding possible. Then, in S261 the call is prioritized over other emergency calls to minimize the effects of transcoding time. In S270 the initial routed PSAP target performs a content query in a social media source to find similar media content with same media codec to this presented in the transcoding stream. In case if similar media content with same media codec to this presented in the transcoding stream is found, the caller is presented with the media content from the social media source.

Figure 3:
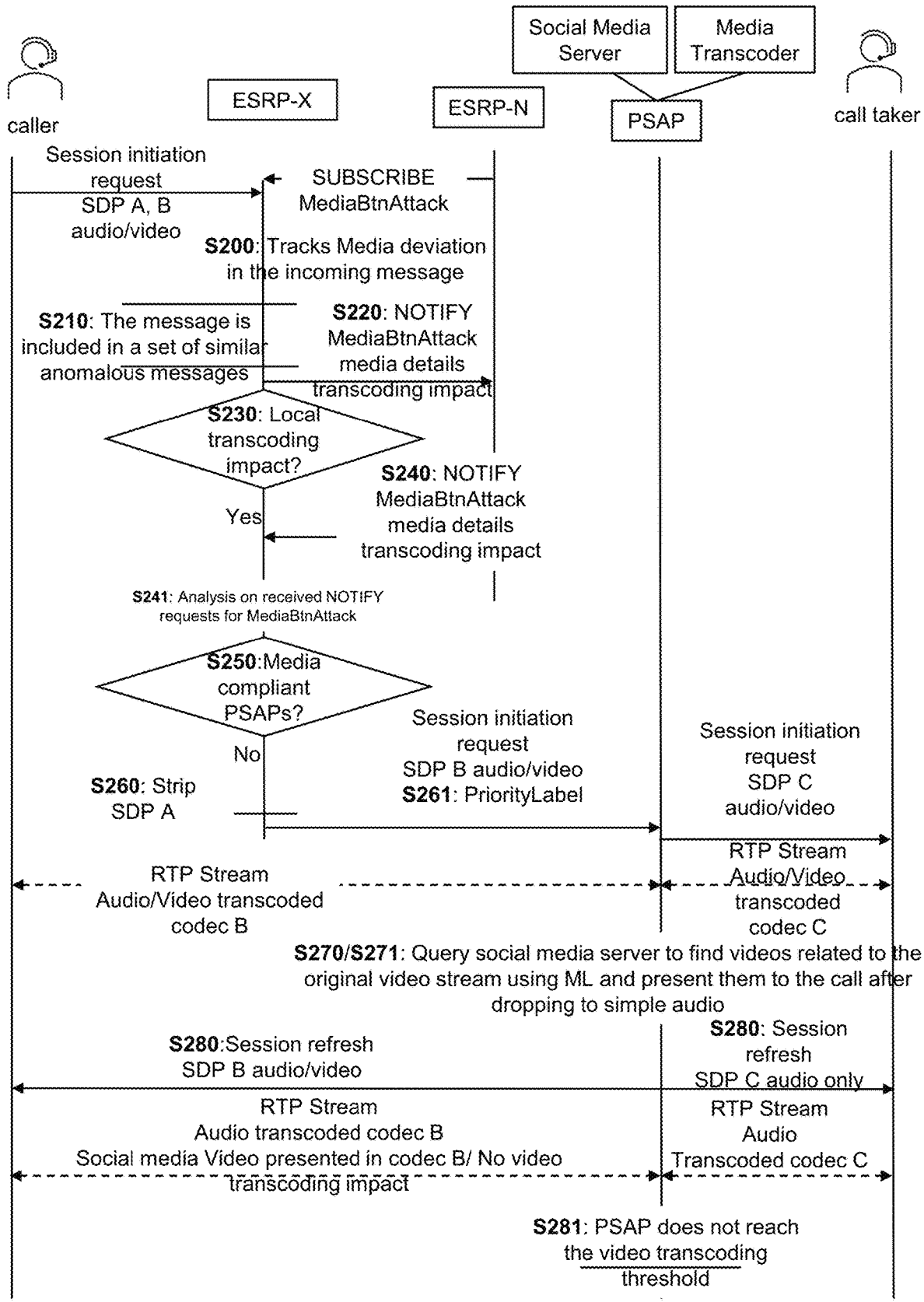
FIG. 3 shows a schematic illustration of a communication path of a method for defeating media-coordinated attacks on emergency call networks according to another exemplary embodiment of the invention.

FIG. 3 shows a schematic illustration of an exemplary communication path of an exemplary method for defeating media-coordinated attacks on emergency call networks according to another embodiment of the invention. In S200 the ESRP-X receives a session initiation request with SDP for codecs A, B for video and audio that targets the emergency service. The request deviates from a predefined media threshold that contains media description details which consider the initiation of an audio and video call. In S210 the ESRP-X logs this message under a set of messages which meet the same requirements defined in S200. In S220 the ESRP-X sends a NOTIFY message to ESRP-N in order to inform about a potential media-coordinated DDoS attack (MediaBtnAttack). Additionally, the ESRP-X sends the media details of the PSAP elements which are monitored by the ESRP-X as well as a possible transcoding impact S230. The transcoding impact is added in the notification message as a binary piece of information, but the codec which caused the transcoding, in this case the SDP A, B, is also included as a notification information. This is important for the other ESRP elements in order to deduce if there are other PSAP elements that may support the requested codecs A and B. In S240/S241 the ESRP-X receives from the ESRP-N, a notification about a potential media-coordinated DDoS attack which contains the binary information of the transcoding, in this case is 0 (i.e., the stream does not need to be transcoded). Moreover, it receives the media details of the PSAP elements which operate under the umbrella of ESRP-N which are equal to codecs C and E. In S250 ESRP-X identifies that there are not available codecs in the PSAP elements of ESRP-N that match A or B. Thus, in S260 the ESRP-X strips codec A from the SDP body of the session initiation request which is examined. In S261 the ESRP-X forwards the call to the PSAP only with SDP B details. In this step a priority label is also added in the call in order to be delivered to the call taker with a priority. Using this approach, the transcoding time will be reduced for the examined call due to the fact that even if the caller waits in the call queue the stream is transcoded in order to deliver an audio/video stream from an Interactive Voice Response system (IVR). After these steps, the call is connected between the caller and the call taker. In S270/S271 the PSAP element queries the social media server in order to retrieve media related to the emergency incident of the examined call. Additionally, the method offers the caller videos from the social media delivered in the media format that the caller understands after the ML comparison has identified that this video retrieved from the social media is similar to the original stream presented by the caller. Keep in mind that this RTP connection is not related to the device capabilities, i.e. to the codecs supported by the devices in the PSAP and thus it is possible to deliver this content using the same codec that the caller requests. Still, S280 offers the caller with videos from the social media which are not only similar to the original stream, but more importantly are offered to the caller using the same media encoding format which entails that there is no need for a transcoding operation and the call on PSAP side can be dropped to audio only. In S281 the PSAP element does not reach the video transcoding limit, thus the method does not perform any operation in this step.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

The invention claimed is:

1. A method for defeating media-coordinated attacks on emergency call networks, the method comprising:
   receiving, by a first Emergency Services Routing Proxy (ESRP) element, a session initiation request with a session description Protocol (SDP) body wherein the session initiation request deviates from a preconfigured media threshold k from a caller;
   logging, by the first ESRP element, the session initiation request which deviates from the preconfigured media threshold in a set of session initiation requests with the SDP body received by the first ESRP element;
   sending, by the first ESRP element, an alert notification to a second ESRP element or other ESRP elements which have subscribed using a subscribed/notify mechanism for a potential media-coordinated attack;
   verifying, by the first ESRP element, whether there is a transcoding impact in the routing to a first Public Safety Answering Point (PSAP) element of the first ESRP element that will handle the call and:
      in response to determining that there is no transcoding impact present, transferred to the first PSAP element, otherwise;
         gathering and analyzing, by the first ESRP element, alert notifications which have been received using the subscribed/notify mechanism for the potential media-coordinated attacks from the second ESRP element or other ESRP elements in the network and
      evaluating, by the first ESRP, the alert notifications from the second ESRP element and/or other ESRP elements to determine whether there is any media capable PSAP element in any one of the ESRP elements in the network which can handle the call without transcoding such that the call is routed to a second PSAP element without transcoding in response to determining there is a media capable PSAP element that can handle the call without transcoding and otherwise downgrading, by the first ESRP element, the call to audio only and routing the call to the first PSAP element.

2. The method of claim 1, wherein the preconfigured media threshold k is in a timeframe of x seconds or is based on media capabilities of the devices present in PSAP elements which are monitored by the first ESRP element.

3. The method of claim 1, wherein the media coordinated attacks are Denial of Service (DoS) or Distributed Denial of Service (DDoS) attacks.

4. The method of claim 1, wherein the alert notification comprises a transcoding impact if existing or the media capabilities of the devices present in PSAP elements which are monitored by the first ESRP element.

5. The method of claim 1, comprising:
initiating a call in a private line between call takers of the first and second PSAP elements.

6. The method of claim 1, wherein in the case there is no media-capable PSAP element in any one of the ESRP elements in the network which can handle the call without transcoding, evaluating, by the first ESRP element, if there are more than one media descriptors in the SDP body of the session initiation request and stripping, by the first ESRP element, those media codecs which use the most CPU resources and then performing the transcoding process.

7. The method of claim 6, comprising:
prioritizing, by the first ESRP element, the call over other emergency calls before transcoding.

8. The method of claim 7, wherein during the transcoding process:
performing, by the first PSAP element, a content query in a social media server of the first PSAP element to find similar media content with same media codec to this presented in the transcoding stream, if similar media content with same media codec to this presented in the transcoding stream, the caller is presented with the media content from the social media server.

9. The method of claim 8, wherein the media content query is done using Machine Learning techniques.

10. The method of claim 8 comprising:
dropping, by the PSAP, the call to only audio if similar media content with the same media codec to this presented in the transcoding stream is been found.

11. The method of claim 6, comprising:
dropping, by the first PSAP, the call to only audio if the first PSAP has reached a certain media transcoding threshold n.

12. A network comprising:
a plurality of Emergency Services Routing Proxy (ESRP) elements wherein each of the ESRP elements comprise a plurality of corresponding Public Safety Answering Point (PSAP) elements with at least one device capable to receive calls wherein the PSAP elements are monitored by their corresponding ESRP element; wherein the network is configured such that:
a session initiation request with a session description Protocol (SDP) body is receiveable by a first ESRP element of the plurality of ESRP elements wherein the session initiation request deviates from a preconfigured media threshold k from a caller;
an alert notification is sendable from the first ESRP element to a second ESRP element or other ESRP elements of the ESRP elements which have subscribed using a subscribed/notify mechanism for a potential media-coordinated attack in response to the first ESRP element determining that the session initiation request which deviates from the preconfigured media threshold in a set of session initiation requests with the SDP body received by the first ESRP element;
the first ESRP element configured to verify whether there is a transcoding impact in the routing to a first Public Safety Answering Point (PSAP) element of the first ESRP element that will handle the call and, in response to determining that there is no transcoding impact present, transferred to the first PSAP element and otherwise:
gathering and analyzing alert notifications which have been received using the subscribed/notify mechanism for the potential media-coordinated attacks from the second ESRP element or other ESRP elements in the network and
evaluating, by the first ESRP, the alert notifications from the second ESRP element or other ESRP elements to determine whether there is any media capable PSAP element in any one of the ESRP elements in the network which can handle the call without transcoding such that the call is routed to a second PSAP element without transcoding in response to determining the second PSAP element is a media capable PSAP element that can handle the call without transcoding and otherwise downgrading, by the first ESRP element, the call to audio only and routing the call to the first PSAP element.

13. The network of claim 12, further comprising:
at least one social media server component or at least one media transcoder component.

14. The network according to claim 12, further comprising:
at least one machine learning (ML) element, Interactive Voice Response (IVR) system, Gateway (GW), Border Control Function (BCF) or Session Border Control (SBC).

15. A non-transitory computer readable medium having code stored thereon that defines a method performed by a computer device that runs the code, the method comprising:
logging a session initiation request with a session description Protocol (SDP) body which deviates from a preconfigured media threshold k in a set of session initiation requests with the SDP body received by the computer device;
sending an alert notification to at least one Emergency Services Routing Proxy (ESRP) element of a network which have subscribed using a subscribed/notify mechanism for a potential media-coordinated attack;
verifying whether there is a transcoding impact in the routing to a first Public Safety Answering Point (PSAP) element of the computer device that will handle the call and:
in response to determining that there is no transcoding impact present, transferred to the first PSAP element, otherwise;
gathering and analyzing alert notifications which have been received using the subscribed/notify mechanism for the potential media-coordinated attacks from the at least one ESRP element in the network and
evaluating the alert notifications from the at least one ESRP element to determine whether there is any media capable PSAP element in any one of the at least one ESRP elements of the network which can handle the call without transcoding such that the call is routed to a second PSAP element without transcoding in response to determining the second PSAP element is a media capable PSAP element that can handle the call without transcoding and otherwise downgrading, by the first ESRP element, the call to audio only and routing the call to the first PSAP element.

* * * * *